(12) United States Patent
Mano

(10) Patent No.: US 6,803,940 B2
(45) Date of Patent: Oct. 12, 2004

(54) LASER BEAM SCANNER HAVING AN OPTICAL PATH ADJUSTMENT SYSTEM

(75) Inventor: Kozo Mano, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/811,389

(22) Filed: Mar. 20, 2001

(65) Prior Publication Data

US 2001/0023921 A1 Sep. 27, 2001

(30) Foreign Application Priority Data

Mar. 21, 2000 (JP) .......................................... 2000-78985

(51) Int. Cl.[7] .............................................. B41J 27/00
(52) U.S. Cl. ....................................... 347/241; 347/256
(58) Field of Search ................................ 347/234, 235, 347/241, 248, 250, 256, 116, 232, 243, 259, 260; 250/235, 578.1, 236; 359/212, 223, 35, 629; 372/31; 355/29

(56) References Cited

U.S. PATENT DOCUMENTS

| | | | |
|---|---|---|---|
| 4,490,608 A | * 12/1984 | Yeadon et al. | ............... 250/235 |
| 4,560,244 A | * 12/1985 | Ackerman | ................... 359/223 |
| 4,806,951 A | * 2/1989 | Arimoto et al. | ............. 347/235 |
| 4,841,137 A | * 6/1989 | Mochizuki et al. | .......... 250/236 |
| 4,949,100 A | * 8/1990 | Hidaka | ........................ 347/232 |
| 4,978,197 A | * 12/1990 | Horikawa | ................... 359/629 |
| 5,235,438 A | 8/1993 | Sasada | ......................... 347/116 |
| 5,379,059 A | * 1/1995 | Winsor | ......................... 347/232 |
| 5,436,645 A | * 7/1995 | Uemura et al. | ................ 372/31 |
| 5,627,670 A | * 5/1997 | Minoura et al. | ............. 359/212 |
| 5,883,385 A | * 3/1999 | Takahashi et al. | ........... 250/235 |
| 6,144,441 A | * 11/2000 | Morita et al. | ................... 355/29 |
| 6,236,040 B1 | 5/2001 | Takemura et al. | ........... 250/235 |
| 6,271,869 B1 | 8/2001 | Tada et al. | .................... 358/481 |
| 6,292,279 B1 | * 9/2001 | Matsuyama | ................... 359/35 |

FOREIGN PATENT DOCUMENTS

| | | | | |
|---|---|---|---|---|
| JP | 2-236538 | * | 9/1990 | ........... G03B/33/12 |
| JP | 2-244022 A | | 9/1990 | |
| JP | 10-260368 A | | 9/1998 | |
| JP | 11-84293 A | | 3/1999 | |
| JP | 2000-180773 A | | 6/2000 | |

\* cited by examiner

*Primary Examiner*—Hai Pham
(74) *Attorney, Agent, or Firm*—Smith Patent Office

(57) ABSTRACT

A laser beam scanner for scanning primary colors of red, green and blue laser beams on the same scanning plane includes three sets of a laser light source, an acousto-optic modulator, an adjustable mirror corresponding to the primary colors, and a polygon mirror, an fθ lens, and a pair of mirrors. One of the mirrors serves as a beam splitter for splitting the laser beams into a first way for introducing the laser beams to the scanning plane and the second way for introducing a position sensor disposed on a plane optically conjugated with the scanning plane. The adjustable mirrors are adjusted in a manner so that the red and blue laser beams are to be overlapped on the green laser beam by monitoring the positions of laser beams sensed by the position sensor.

12 Claims, 8 Drawing Sheets

LASER BEAM SCANNER HAVING AN OPTICAL PATH ADJUSTMENT SYSTEM

BACKGROUND OF THE INVENTION

1. Field of the Invention

This invention relates to a laser beam scanner and a photographic printer using the laser beam scanner as an exposure apparatus for exposing a photographic paper.

2. Description of the Related Art

A conventional a photographic printer using a laser beam scanner as an exposure apparatus, for example, shown in Publication Gazette of Japanese Patent application Hei 11-84293 is described. In the photographic printer, a photographic paper is conveyed in a predetermined direction (hereupon, the direction is called "sub-scanning direction") at a predetermined constant speed. Laser beams corresponding to three primary colors or complementary colors thereof are scanned on a photo-sensitive surface of the photographic paper in a main scanning direction perpendicular to the sub-scanning direction. Intensities of the laser beams are respectively modulated for corresponding to an image data which is taken by scanning a film or photograph by an image pickup scanner or directly taken by a digital camera, or the like.

When the scanning lines of the laser beams corresponding to the principal colors are discrepant, it will be the cause of reduction of quality of an image formed on the photographic paper, since bleeding occurs in color development. For preventing the occurrence of the bleeding of colors, optical paths of the laser beam scanner corresponding to the laser beams are precisely adjusted in a manner so that scanning lines of the laser beams are overlapped with each other on the photographic paper.

In an assembly of a unit of laser beam scanner provided in the conventional photographic printer, a measuring instrument is disposed at a predetermined position on an optical table optically conjugated with a predetermined scanning plane of a conveyor for conveying the photographic paper. The optical paths of the laser beams are adjusted to be overlapped on the measuring instrument while the laser beams have been irradiated. Alternatively, a previously assembled unit of the laser beam scanner is mounted in the photographic printer, and the measuring instrument is directly disposed at a predetermined position on the scanning plane of the conveyor, and the optical paths of the laser beams are adjusted. It, however, requires much labor to adjust the optical path, for example, by adjusting a reflection angel of a mirror with monitoring the laser beams scanning on the measuring instrument and to dispose the measuring instrument at the predetermined position on the optical table at or on the conveyor in the photographic printer precisely.

Furthermore, it is necessary to interchange electronic elements such as a laser light source and an optical modulator, since the electronic elements have a shorter-life than that of optical elements such as a mirror and a lens. When at least one element is interchanged, it is necessary to re-adjust the optical paths of the laser beams. It, however, is substantially impossible to re-adjust the optical paths of the laser beams, since other elements of the photographic printer occupy the space into which the above-mentioned measuring instrument is disposed on the conveyor, after the completion of the assembly of the photographic printer. Thus, whole unit of the laser beam scanner is generally interchanged after the completion of the photographic printer.

SUMMARY OF THE INVENTION

An object of the present invention is to provide a laser beam scanner and a photographic printer using the same, by which optical paths of the laser beams can be adjusted without using the measuring instrument disposed on a scanning line on which the laser beams be scanned.

A laser beam scanner in accordance with the present invention comprises at least two laser light sources for oscillating and emitting at least two leaser beams having different wavelength, an optical scanning system for scanning the laser beams on a predetermined scanning plane, and an optical paths adjusting system for adjusting optical paths of the optical scanning system. The optical paths adjusting system includes a position sensor disposed on a plane optically conjugated with the predetermined scanning plane, and at least an adjuster for adjusting an optical path of a laser beam corresponding to the adjuster.

By such a configuration, since the position sensor is disposed on the plane optically conjugated with the scanning plane, the positions where the laser beams reach on the position sensor correspond to the positions on the scanning plane where the laser beams actually will be scanned. When the positions of the laser beams on the position sensor are not coincided, it is possible to adjust the adjuster so that at least one position of the laser beam coincides with or approaches to another position of the laser beam by monitoring the sensed result of the position sensor. As a result, at least two optical paths of the laser beams can be adjusted so as to overlap the scanning lines of the laser beams with each other.

A photographic printer in accordance with the present invention includes the above-mentioned laser beam scanner, a conveyor for conveying a photographic paper to the predetermined scanning plane of the above-mentioned laser beam scanner and a developer for developing a latent image exposed on the photographic paper by the laser beam scanner.

By using the above-mentioned laser beam scanner as an exposure unit, the optical paths of the scanning system in the laser beam scanner can be adjusted easily without disassembly of the photographic printer largely, when the electronic element such as the laser light source is interchanged due to the deterioration thereof.

DETAILED DESCRIPTION OF THE EMBODIMENT

An embodiment of a laser beam scanner and a photographic printer using the same in accordance with this invention is described.

Figure 1:
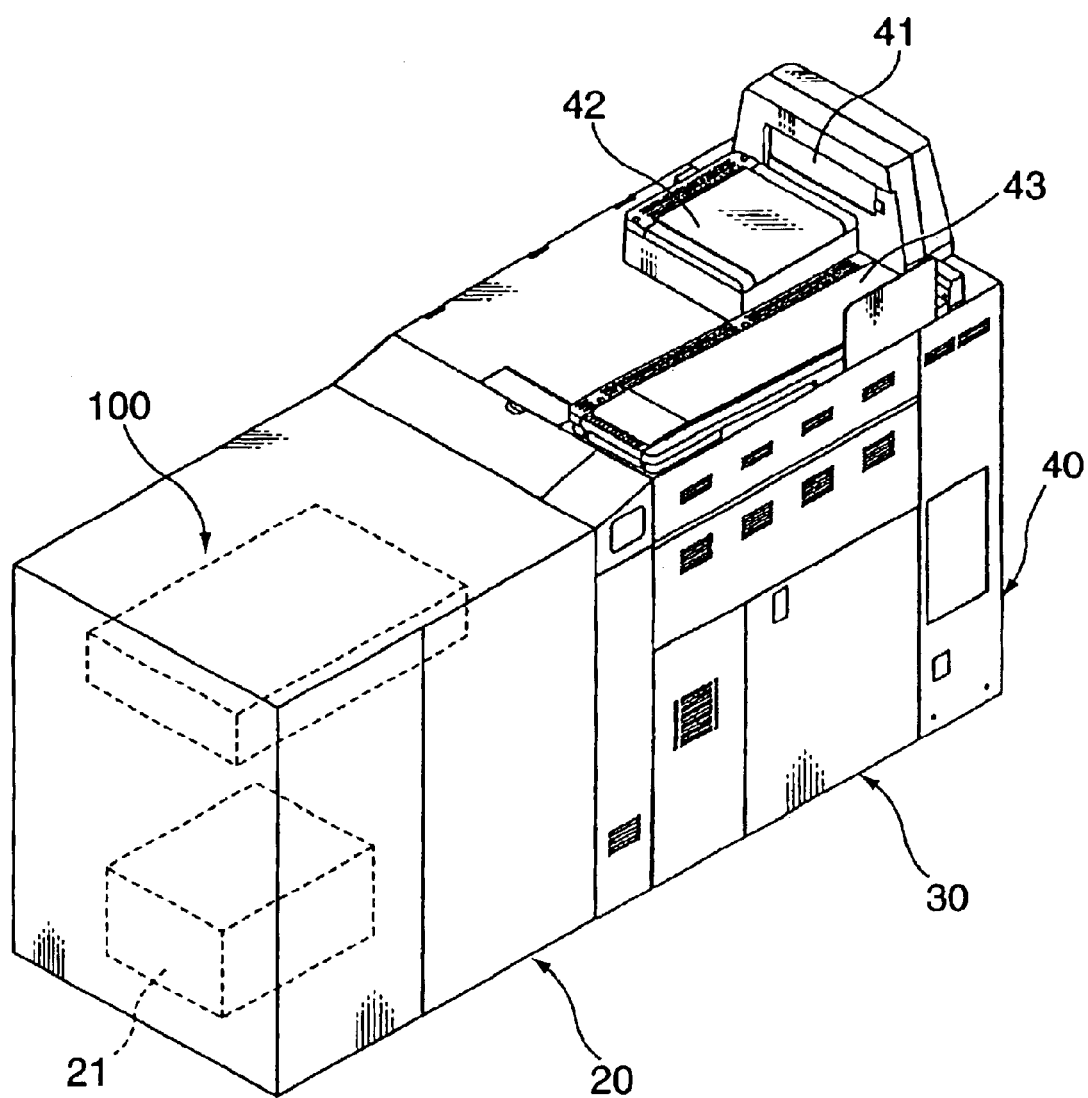
FIG. 1 is a perspective view for showing an appearance of a photographic printer in accordance with the present invention.

An appearance of the photographic printer in the embodiment is shown in FIG. 1. The photographic printer comprises an exposure unit 20 for exposing a photographic paper, a developing unit 30 for developing, fixing, bleaching and stabilizing the photographic paper and a drying unit 40 for drying the photographic paper. A first belt conveyor 42 and a second belt conveyor 43 are provided on the top of the developing unit 30. Developed photographic paper sheets carried out from an outlet 41 are piled on the first belt conveyor 42 by the same job. Each bunch of the photographic paper sheets are aligned on the second belt conveyor 43.

The exposure unit 20 is a dark box including a laser beam scanner 100, a magazine 21 containing a roll of photographic paper, a cutter for cutting the photographic paper into a predetermined size of a photographic paper sheet, a conveyor for pulling out the photographic paper from the magazine 21 to the cutter and for conveying the photographic paper sheet to the developing unit 30 through an exposing portion.

Figure 2:
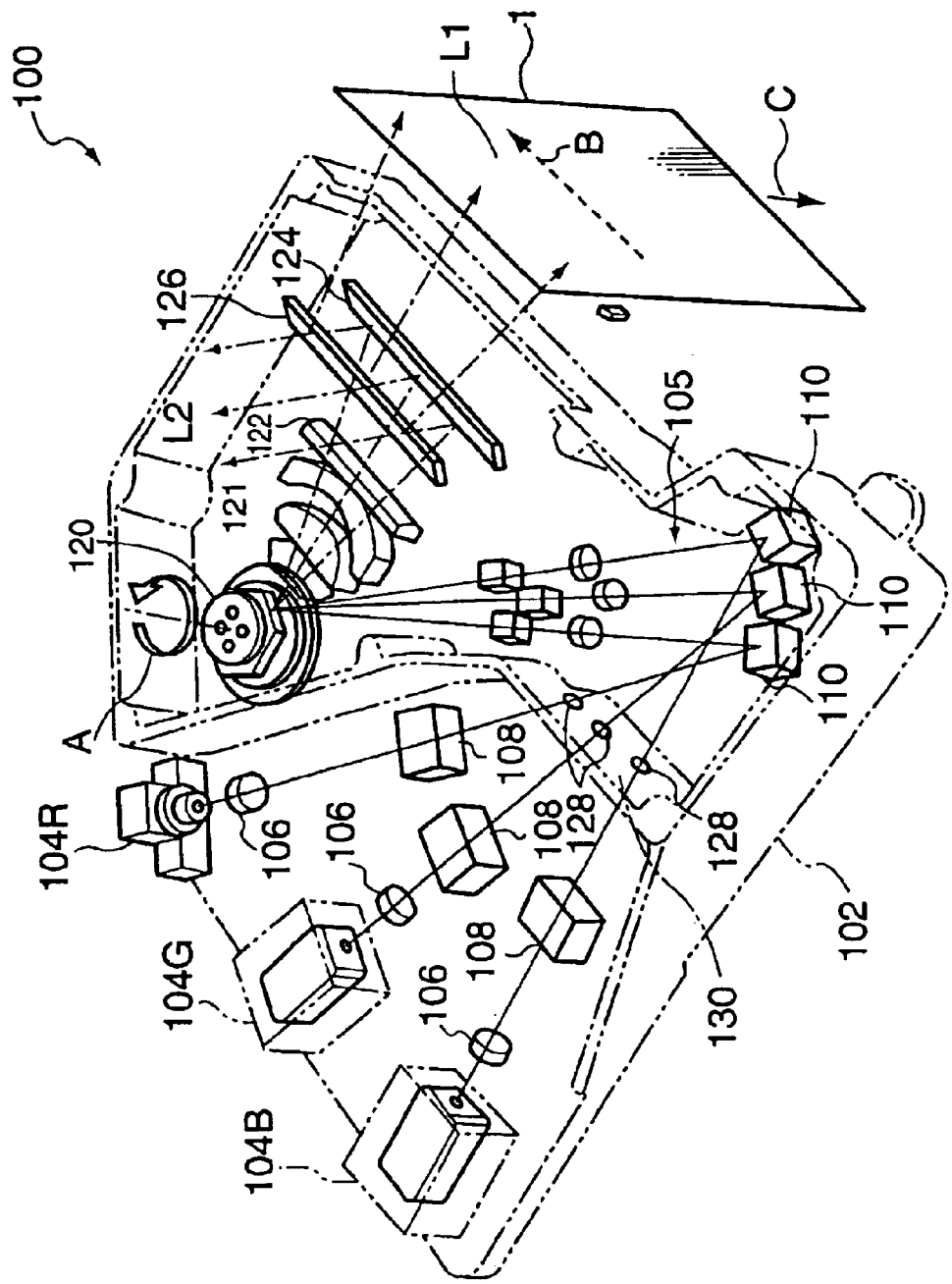
FIG. 2 is a perspective view for showing a configuration of a laser beam scanner in an embodiment in accordance with the present invention.

Detailed configuration of the laser beam scanner 100 used for exposing the photographic paper sheet is shown in FIG. 2. The laser beam scanner 100 comprises three laser light sources 104R, 104G and 104B respectively corresponding to three principal colors of red, green and blue. The laser light source 104R includes a semiconductor laser for emitting a red laser beam having a wavelength of 680 nm. The laser light source 104G includes the semiconductor laser and a wavelength converting device for concerting the laser beam emitted form the semiconductor laser to a green laser beam having a wavelength of 532 nm. The laser light source 104B includes the semiconductor laser and a wavelength converting device for converting the laser beam emitted from the semiconductor laser to a blue laser beam having a wavelength of 473 nm.

Three sets of a collimator lens 106 and an acousto-optic modulator 108 are respectively provided in front of the laser beam emitting surface of the laser light sources 104R, 104G and 104B. Three adjustable mirrors 110 are provided on optical paths 105 of the laser beams emitted from the laser light sources 104R, 104G and 104 B for reflecting the laser beams toward a polygon mirror 120. The polygon mirror 120 is rotated, for example, in a direction shown by arrow A at a predetermined constant rotation speed for reflecting the laser beams in a predetermined direction.

An fθ lens 121, a cylindrical lens 122, a pair of mirrors 124 and 126 are serially disposed in front of the polygon mirror 120. The laser beams are deflected by the rotation of the polygon mirror 120, the fθ lens 121 and the cylindrical lens 122 in the main scanning direction shown by arrow B, and reflected by the mirrors 124 and 126 in the sub-scanning direction shown by arrow C. The mirror 126 is a half mirror serving as a beam splitter for splitting the laser beams into two ways shown by symbols L1 and L2.

As can be seen from FIG. 2, a housing 102 of the laser beam scanner 100 is separated in two sections by a wall 130. Electronic elements of the laser light sources 104R, 10G and 104B and the acousto-optic modulators 108, and so on are concentratively disposed in the left hand section of the wall 130. On the other hand, optical and mechanical elements of the mirrors 110, 124 and 126, the polygon mirror 120 and the fθ lens 121, and so on are concentratively disposed in the right hand section of the wall 130. Three through holes 128 are formed on the wall 130 through which the laser beams emitted from the laser light sources 104R, 104G and 104B enter into the adjustable mirrors 110 in the right hand section.

Horizontal positions of the laser light sources 104R, 104G and 104B are adjusted with respect to standard points provided on the housing 102. Vertical positions of the laser light sources 104R, 104G and 104B are adjusted by using shims. Furthermore, each adjustable mirror 110 can be rotated around a vertical axis for adjusting the reflection angle of the laser beam.

Figure 3:
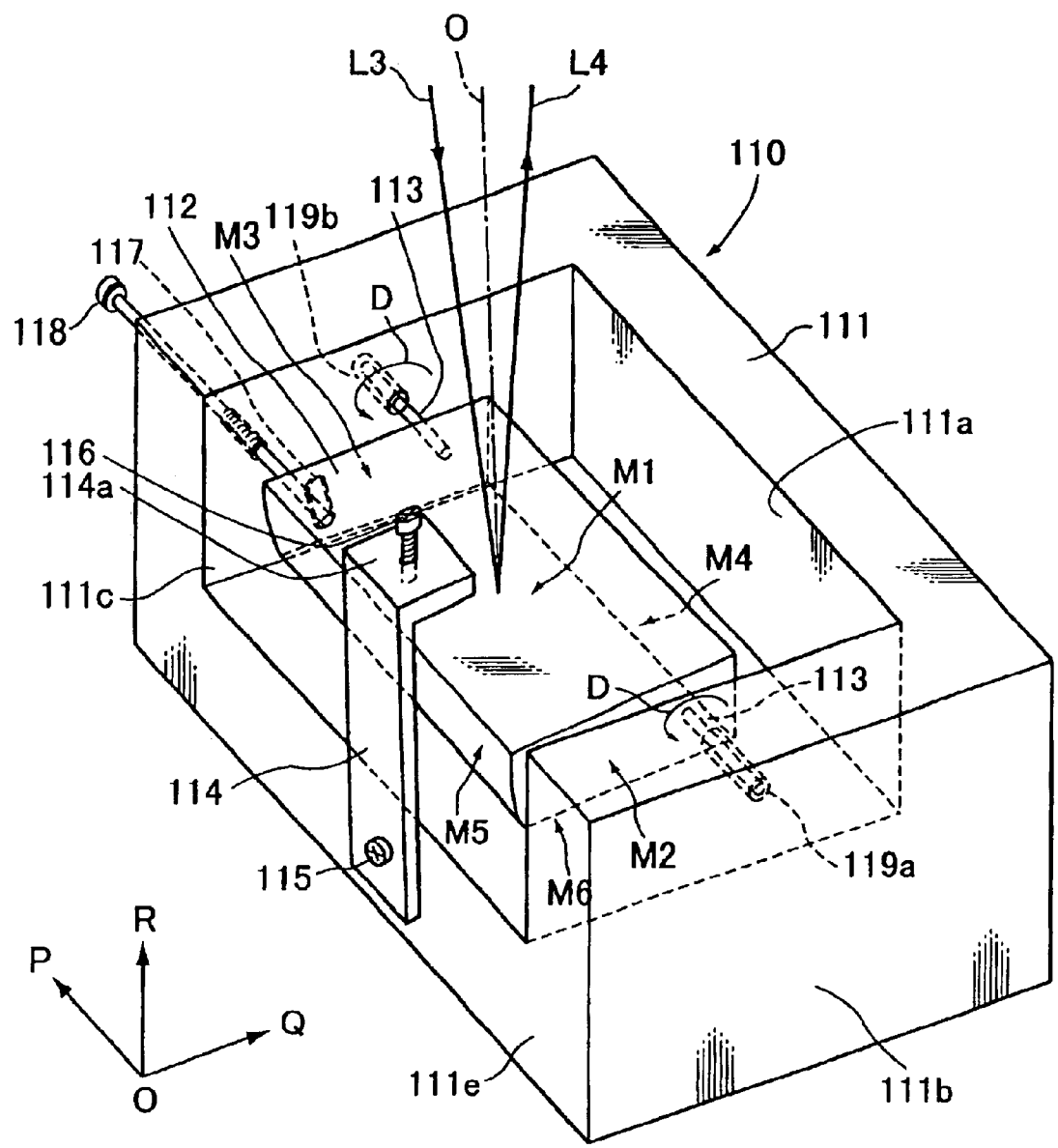
FIG. 3 is a perspective view for showing a detailed configuration of an adjustable mirror used in the laser beam scanner in the embodiment.

Detailed configuration of the adjustable mirror 110 is shown in FIG. 3. In FIG. 3, the direction shown by arrow P corresponds to the vertical direction, and the directions shown by arrows R and Q correspond to the horizontal directions. In FIG. 3, a reflection surface M1 of a mirror body 112 is illustrated to be the top face, intelligibly. A mirror holder 11 has three side walls 111a, 111b and 111c perpendicular to a deck 111d for holding the mirror body 112. A shaft 113 is borne by bearings 119a and 119b provided on the side walls 111b and 111c. The mirror body 112 is rotatably pivoted on the mirror holder 111 by the shaft 113. The position of the shaft 113 is moved toward a side face M4 from the center of side faces M2 and M3 of the mirror body 112.

A groove 117 having a bottom face is formed on the side face M3 of the mirror body 112. A male screw portion of a stopper pin 118 is engaged with a female screw formed on the side wall 111c in a manner so that a top end portion of the stopper pin 118 is protruded toward the mirror body 112 and slidably engaged with the groove 117 of the mirror body 112. A spring (not shown in the figure) is provided between a rear face M6 of the mirror body 112 and the deck 111d of the mirror holder 111 for applying a rotation force to the mirror body 112 in a direction opposite to arrow D. When the stopper pin 118 is screwed so that the top end thereof firmly contacts the bottom face of the groove 117, the rotation of the mirror body 112 is intercepted.

A frame 114 of an adjuster having substantially L-section is fixed on a side face 111e of the deck 111d by a screw 115. An adjusting screw 116 is engaged with a female screw formed on a top wall 114a of the frame 114 in a manner so that a bottom end portion thereof is protruded toward the reflection surface M1 of the mirror body 112. The bottom end of the adjusting screw 116 moves up or down corresponding to the rotation direction of the adjusting screw 116.

When the stopper pin 118 is loosened, the mirror body 112 can be rotated by the rotation force of the spring, so that the reflection surface M1 of the mirror body 112 will contact with the bottom end of the adjusting screw 116 and stop the rotation. Under such the condition, any of the laser light sources 104R, 104G and 104B corresponding to the adjustable mirror 110 to be adjusted is driven for emitting the laser beam. In FIG. 3, an incident laser beam is designated by symbol L3 and a reflected laser beam is designated by symbol L4. Symbol "O" designates the normal of the reflection surface M1 of the mirror body 112.

When the adjusting screw 116 is rotated while the reflected laser beam L4 is monitored, the mirror body 112 is rotated around the shaft 113 corresponding to the movement of the bottom end of the adjusting screw 116, and the reflection angle of the reflected laser beam L4 is varied corresponding to the rotation of the mirror body 112. When the reflected laser beam L4 reaches to a predetermined position corresponding to a standard point on a scanning line, the rotation of the adjusting screw 116 is stopped and the stopper pin 118 is screwed so as not to rotate the mirror body 112, any more.

A side face M5 of the mirror body 112 is curved so as not to contact with the frame 114 when the mirror body 112 is rotated. It is preferable to provide another stopper pin on the side wall 111b of the mirror holder 111 and a groove, with which the stopper pin is engaged, on the side face M2 of the mirror body 112. By such the configuration, the rotation of the mirror body 112 can firmly be intercepted.

Figure 4:
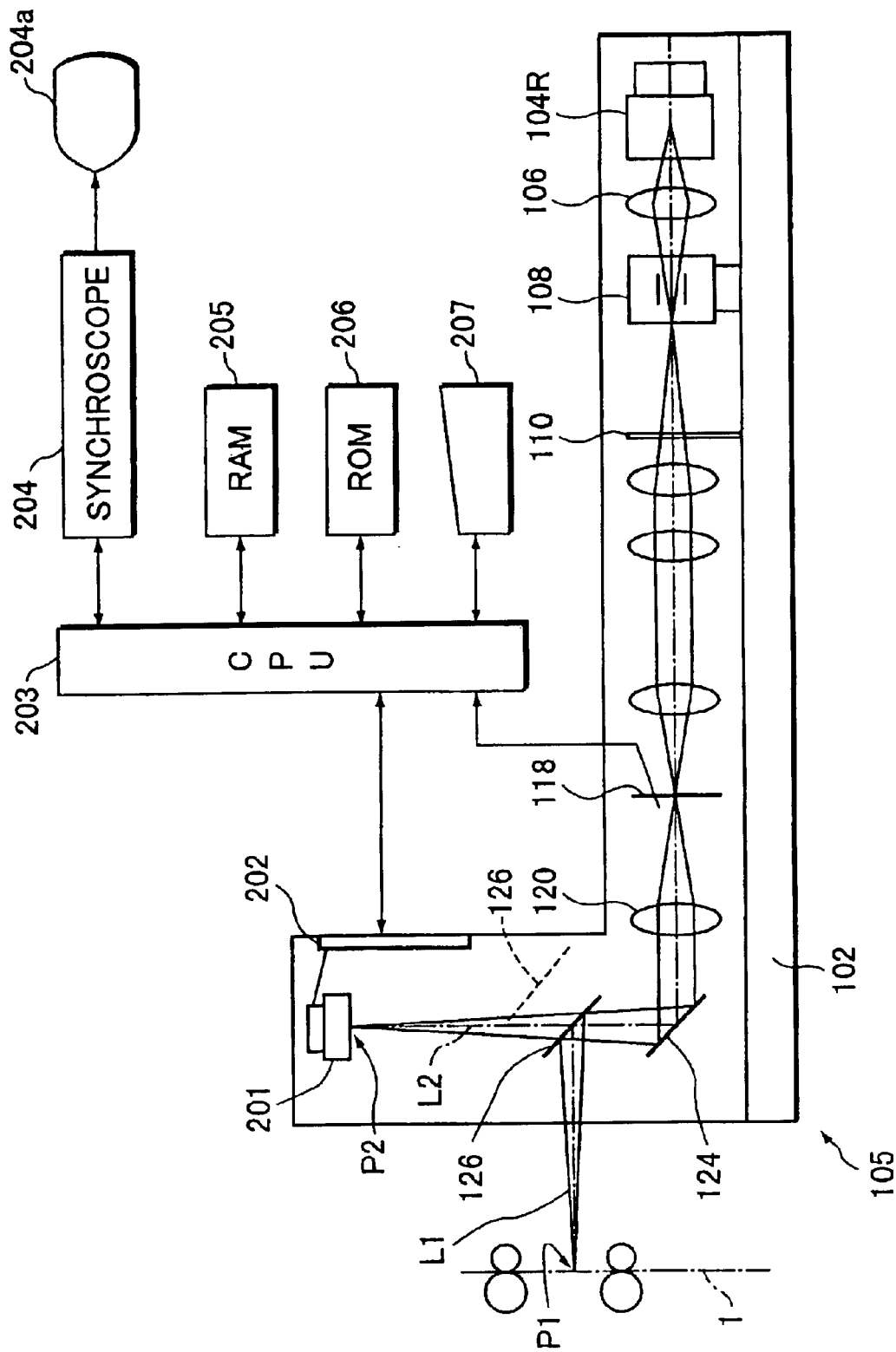
FIG. 4 is a sectional view for showing optical paths in the laser beam scanner and a block diagram of a monitoring system of positions of laser beams in the embodiment.

The optical paths 105 in the laser beam scanner 100 and monitoring system for monitoring the position of the reflected laser beams by the adjustable mirrors 110 is shown in FIG. 4.

A position sensor 201 such as a two-dimensional position sensitive detector (PSD) is disposed at a position or on a plane P2 conjugating with a standard position on the scanning line or a scanning plane P1 on a surface of a photographic paper sheet 1 conveyed by the conveyor. In this embodiment, the position sensor 201 is disposed for facing the mirror 126 in the housing 102. A signal processor 202 is provided in the vicinity of the position sensor 201 in the housing 102. The signal processor 202 executes predetermined signal processing to output signals from the position sensor 201 and outputs the processed signal to a CPU (Central Processing Unit) 203. Since the signal processor 202 is disposed in the vicinity of the position sensor 201, the wiring between them can be shortened so as to receive noise, rarely.

A synchroscope (or an oscilloscope) 204 is connected to the CPU 203 for displaying the position(s), where the laser beam(s) reach, on a monitor display 204a thereof (hereinafter, abbreviated as "position(s) of laser beam(s)"). Furthermore, a ROM (Read Only Memory) 206 for memorizing control programs of the position sensor 201, the signal processor 202, and the synchroscope 204, and a RAM (Random Access Memory) 205 temporarily for memorizing several kinds of parameters used in the position sensing process are connected to the CPU 203. Still furthermore, an operation device such as a key board 207 is connected to the CPU 203 by which an operator can input his judgment such as "YES" or "NO" into the CPU 203. The monitoring system except the position sensor 201 and the signal processor 202 can be detached from the photographic printer after the adjustment of the optical paths is completed.

An example for adjusting the optical paths of the laser beams in this embodiment is described. In the actual photographic printer, it is important that the scanning lines of the laser beams on the photographic paper sheet 1 are overlapped. Thus, the adjustment of the optical paths of the laser beams is executed so that the red laser beam and the blue laser beam are to be overlapped on the green laser beam.

For example, the polygon mirror 120 is stopped so that the reflection surface of the polygon mirror 120 is parallel to the alignment of the mirrors 124 and 126. The adjustable mirror 110 corresponding to the green laser beam is adjusted in a manner so that the green laser beam reaches substantially at the center of position sensor 201 in the main scanning direction, for example, by visual observation or monitoring the monitor display 204a of the synchroscope 204. Subsequently, the adjustable mirrors 110 corresponding to the red and blue laser beams are adjusted in a manner so that the positions of red and blue laser beams are to overlap on the position of green laser beam on the monitor display 204a of the synchroscope 204.

It, however, is difficult to stop the rotation of the polygon mirror 120 at a predetermined position, precisely. Thus, it is preferable to provide an encoder on a rotation shaft of the polygon mirror 120 for sensing the rotation angle of the polygon mirror 120 (these elements are not shown in the figure). While the polygon mirror 120 is rotated, the position of laser beams on the position sensor 201 are varied. Out put signals from the position sensor 201 are taken at a predetermined interval in synchronism with output signals of the encoder, and the positions of the laser beams calculated by using the output signals from the position sensor 201 are continuously displayed on the monitor display 204a of the synchroscope 204. As a result, it is found that three laser beams are overlapped or not at a predetermined standard position or on the scanning line.

Figure 5:
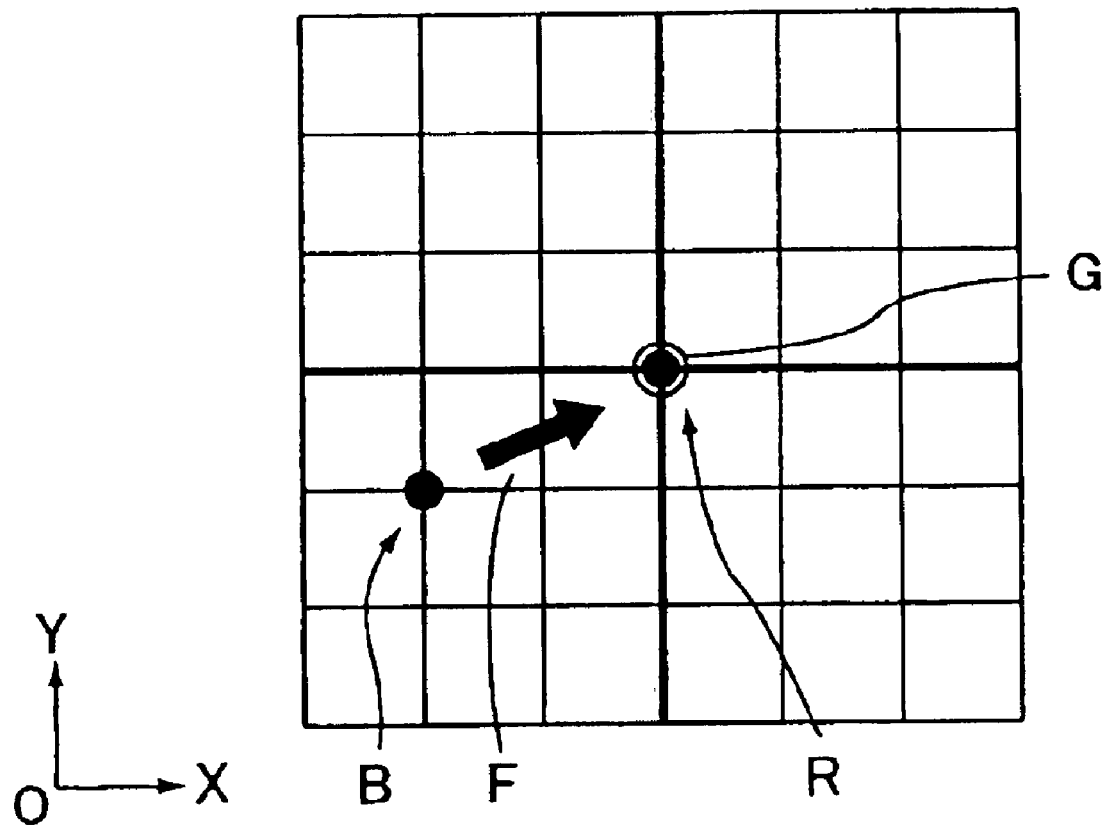
FIG. 5 is a front view for showing an example of a display on a monitor display of a syncroscope while the optical paths of the laser beam scanner in the embodiment are adjusted.

An example of the display on the monitor display 204a of the synchroscope 204 is shown in FIG. 5. In FIG. 5, symbols R, G and B respectively designate the positions of laser beams corresponding to the principal colors of red, green and blue on the position sensor 201.

As can be seen from FIG. 5, the positions designated by symbols R and G are coincided, so that the red laser beam can be overlapped on the scanning line or position of the green laser beam. The position designated by symbol B is discrepant from the positions designated by symbols R and G, so that the blue laser beam cannot be overlapped on the scanning line or position of the green laser beam. When the discrepancy of the positions cannot be acceptable, it causes the occurrence of the bleeding in color development when the exposed photographic paper 1 is developed. Thus, the adjustable mirror 110 and the laser light source 104B corresponding to the blue laser beam are adjusted in a manner so that the position of blue laser beam designated by symbol B moves to approach the positions of red and green laser beams designated by symbols R and G along arrow F in FIG. 5.

Figure 6:
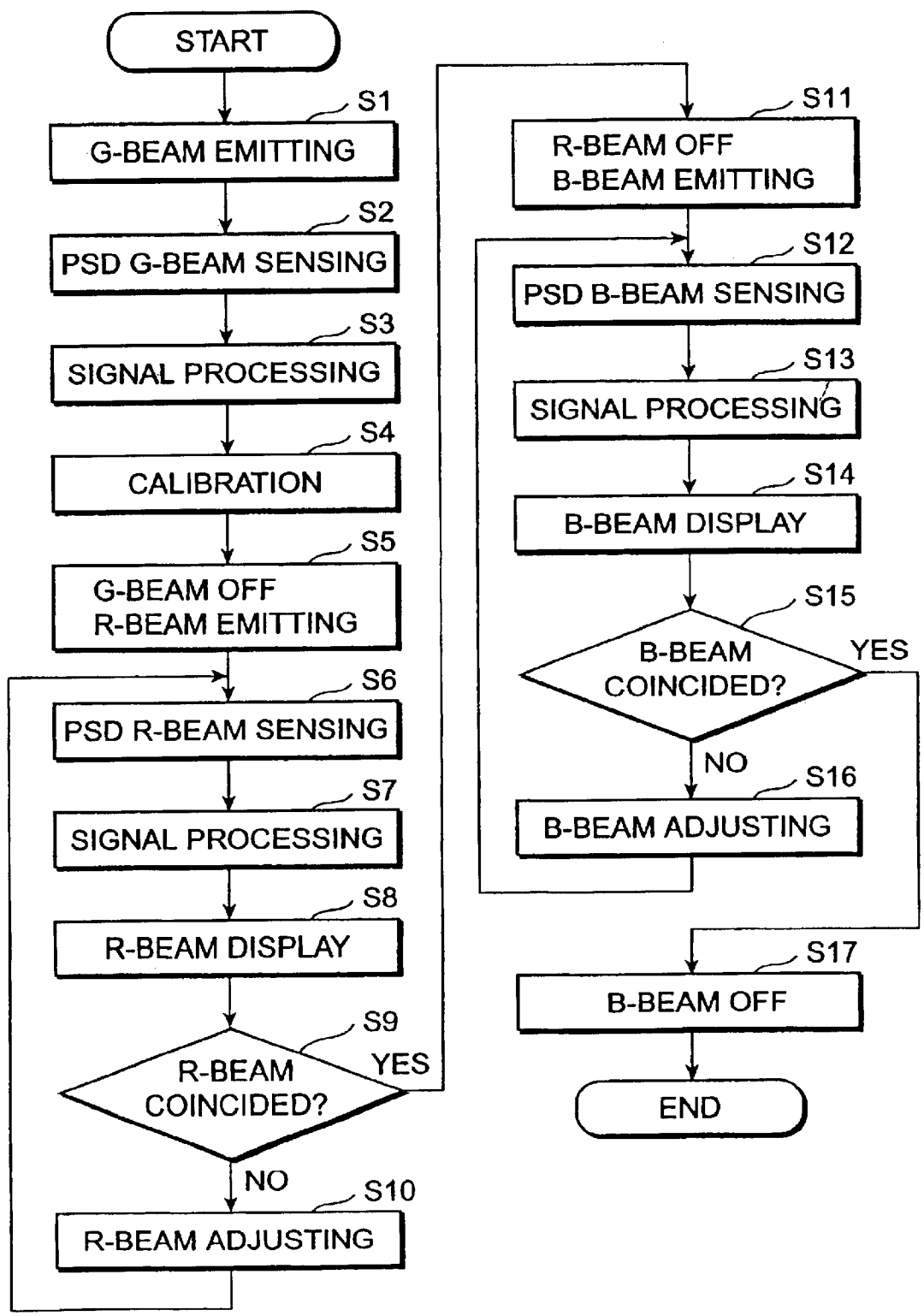
FIG. 6 is a flowchart for showing adjustment process of the optical paths of the laser beam scanner in the embodiment.

The adjustment of the optical paths in the laser beam scanner in this embodiment is described with reference to a flowchart shown in FIG. 6.

When an adjustment program starts, the green laser beam (G-beam) is oscillated by and emitted from the laser light source 104G (Step S1). The green laser beam emitted from the laser light source 104G moves along the optical path formed by the collimator lens 106, the acousto-optic modulator 108, the adjustable mirror 110, the polygon mirror 120, the fθ lens 121, the cylindrical lens 122 and the mirror 124, and reach to the mirror 126 serving as the beam splitter. Since the mirror 126 is the half mirror, a part of each laser beam passes through the mirror 126 and the remainder is reflected toward the scanning line or scanning plane P1. When the green laser beam passing through the mirror 126 reaches to the position sensor (PSD) 201, the position sensor 201 starts to sense the position of the green laser beam and outputs signals corresponding to the sensed position pf green laser beam (Step S2).

Since the position sensor 201 is the two-dimensional position sensitive detectors, the output signals corresponding to the position of green laser beam include two-dimensional position data. The signal processor 202 executes the predetermined signal processing to the output signals corresponding to the position of green laser beam from the position sensor 201 (Step S3). In this embodiment, the red laser beam (R-beam) and the blue laser beam (B-beam) are to be overlapped on the position of the green laser beam, so that the position of the green laser beam is used as a standard position to be adjusted. Thus, the position of green laser beam is calibrated to be at the center on the monitor display 204a of the synchroscope 204 (Step S4).

Subsequently, the emission of the green laser beam by the laser light source 104G is switched off, and the red laser beam is emitted from the laser light source 104R (Step S5). When the red laser beam passing through the mirror 126 reaches to the position sensor 201, the position sensor 201 senses the position of the red laser beam and outputs signals corresponding to the sensed position of red laser beam (Step S6). The signal processor 202 executes the predetermined signal processing to the output signals corresponding to the position of red laser beam from the position sensor 201 (Step S7). The position of red laser beam is displayed on the monitor display 204a of the synchroscope 204 (Step S8).

When the position of red laser beam is displayed on the monitor display 204a of the synchroscope 204, the operator judges whether the position of red laser beam coincides with the position of green laser beam or not. Furthermore, the operator judges whether the discrepancy between the position of red laser beam and the position of green laser beam can be acceptable or not when the position of red laser beam is discrepant from the position of green laser beam (Step S9).

When the discrepancy between the position of red laser beam and the position of green laser beam cannot be acceptable, the operator adjusts the reflection angle of the adjustable mirror 110 corresponding to the red laser beam (Step S10). Subsequently, the steps S6 to S10 are repeated until the position of red laser beam coincides with the position of green laser beam or the discrepancy between the position of red laser beam and the position of green laser beam can be acceptable.

When the position of red laser beam coincides with the position of green laser beam or the discrepancy between the position of red laser beam and the position of green laser beam can be acceptable (YES in Step S9), the operator inputs a predetermined command corresponding to "YES" by using the key board 207, the emission of the red laser beam by the laser light source 104R is switched off, and the blue laser beam is emitted from the laser light source 104B (Step S11). When the blue laser beam passing through the mirror 126 reaches to the position sensor 201, the position sensor 201 senses the position of the blue laser beam and outputs signals corresponding to the sensed position of blue laser beam (Step S12). The signal processor 202 executes the predetermined signal processing to the output signals corresponding to the position of blue laser beam from the position sensor 201 (Step S13). The position of blue laser beam is displayed on the monitor display 204a of the synchroscope 204 (Step S14).

When the position of blue laser beam is displayed on the monitor display 204a of the synchroscope 204, the operator judges whether the position of blue laser beam coincides with the position of green laser beam or not. Furthermore, the operator judges whether the discrepancy between the position of blue laser beam and the position of green laser beam can be acceptable or not when the position of blue laser beam is discrepant from the position of green laser beam (Step S15).

When the discrepancy between the position of blue laser beam and the position of green laser beam cannot be acceptable, the operator adjusts the reflection angle of the adjustable mirror 110 corresponding to the blue laser beam (Step S16). Subsequently, the steps S12 to S16 are repeated until the position of blue laser beam coincides with the position of green laser beam or the discrepancy between the position of blue laser beam and the position of green laser beam can be acceptable.

When the position of blue laser beam coincides with the position of green laser beam or the discrepancy between the position of blue laser beam and the position of green laser beam can be acceptable (YES in Step S15), the operator inputs a predetermined command corresponding to "YES" by using the key board 207, the emission of the blue laser beam by the laser light source 104B is switched off (Step S17), and the adjustment of the optical paths in the laser beam scanner is completed.

By the above-mentioned configuration, the operator can be adjusted the optical paths 105 of the laser beams in the laser beam scanner 100 by monitoring the monitor display 204a of the synchroscope 204 without positioning the measuring instrument on the scanning plane P1 of the conveyor in the photographic printer, so that the adjustment of the optical paths can be made much easier than the conventional adjusting method. Furthermore, when the electronic element such as the laser light source 104R, 104G or 104B or the acousto-optic modulator 108 is interchanged due to the deterioration thereof, the optical path of the laser beam corresponding to the interchanged element can easily be adjusted while the laser beam scanner 100 is mounted in the photographic printer.

Figure 7:
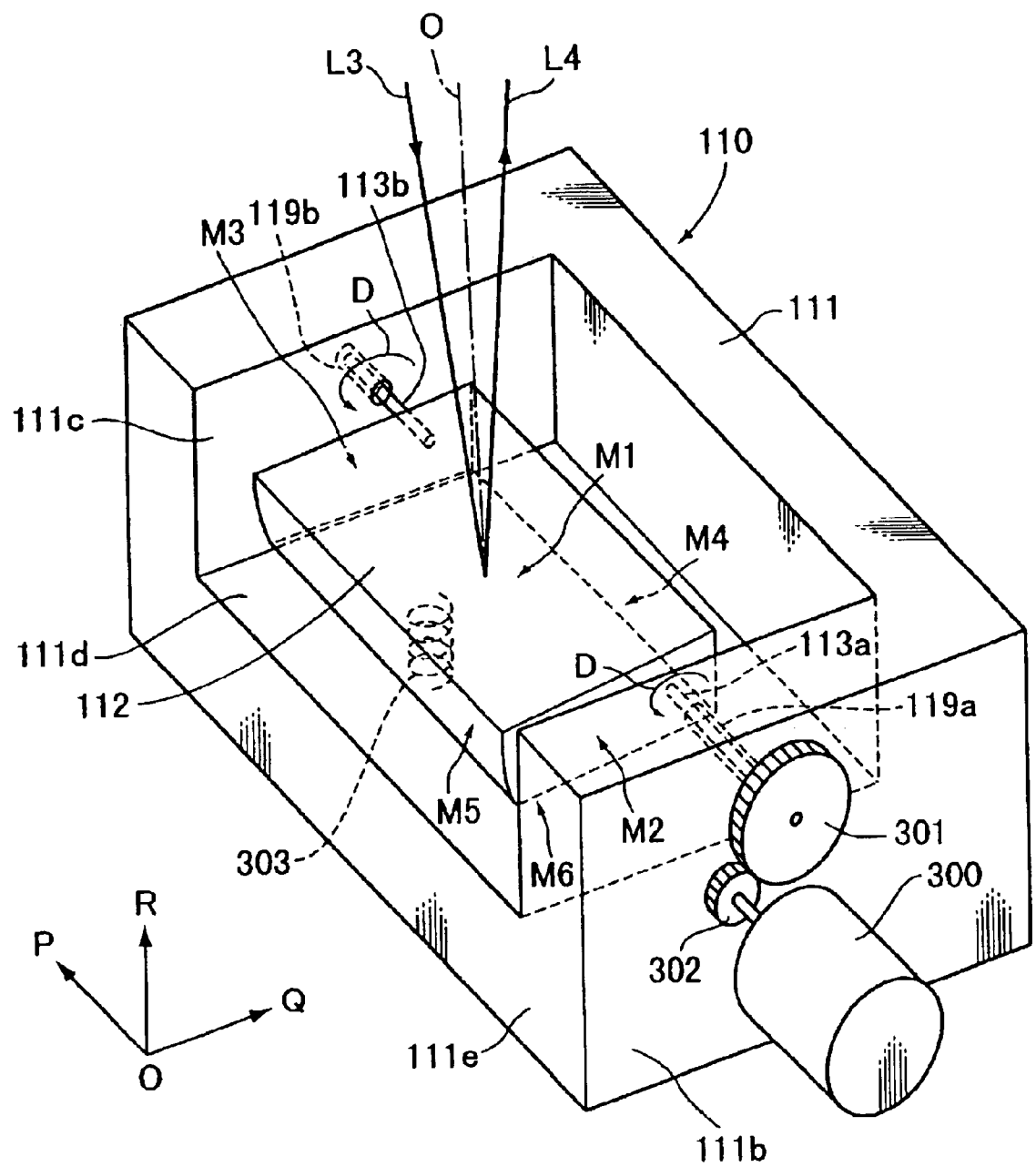
FIG. 7 is a perspective view for showing a detailed configuration of a modified mirror used in the laser beam scanner in the embodiment.

A modification of the adjustable mirror 110 is described with reference to FIG. 7. In this modification, the angle of the reflection surface of the mirror body 112 can be adjusted by an actuator 300 such as a motor. The shaft 113a penetrates the side wall 111b and a gear 301 is fixed on the end of the shaft 113a. A pinion 302 fixed on a shaft of the actuator 300 is engaged with the gear 301. A spring 303 is provided between the rear face M6 of the mirror body 112 and the deck 111d of the mirror holder 111 for canceling backlash of the gear 301 and the pinion 302. The force of the spring 303 is to be underpowered than the magnetic resistance of the actuator 300 so as not to rotate the mirror body 112. The elements designated by the same numeral or symbol are substantially the same as those in FIG. 3.

Figure 8:
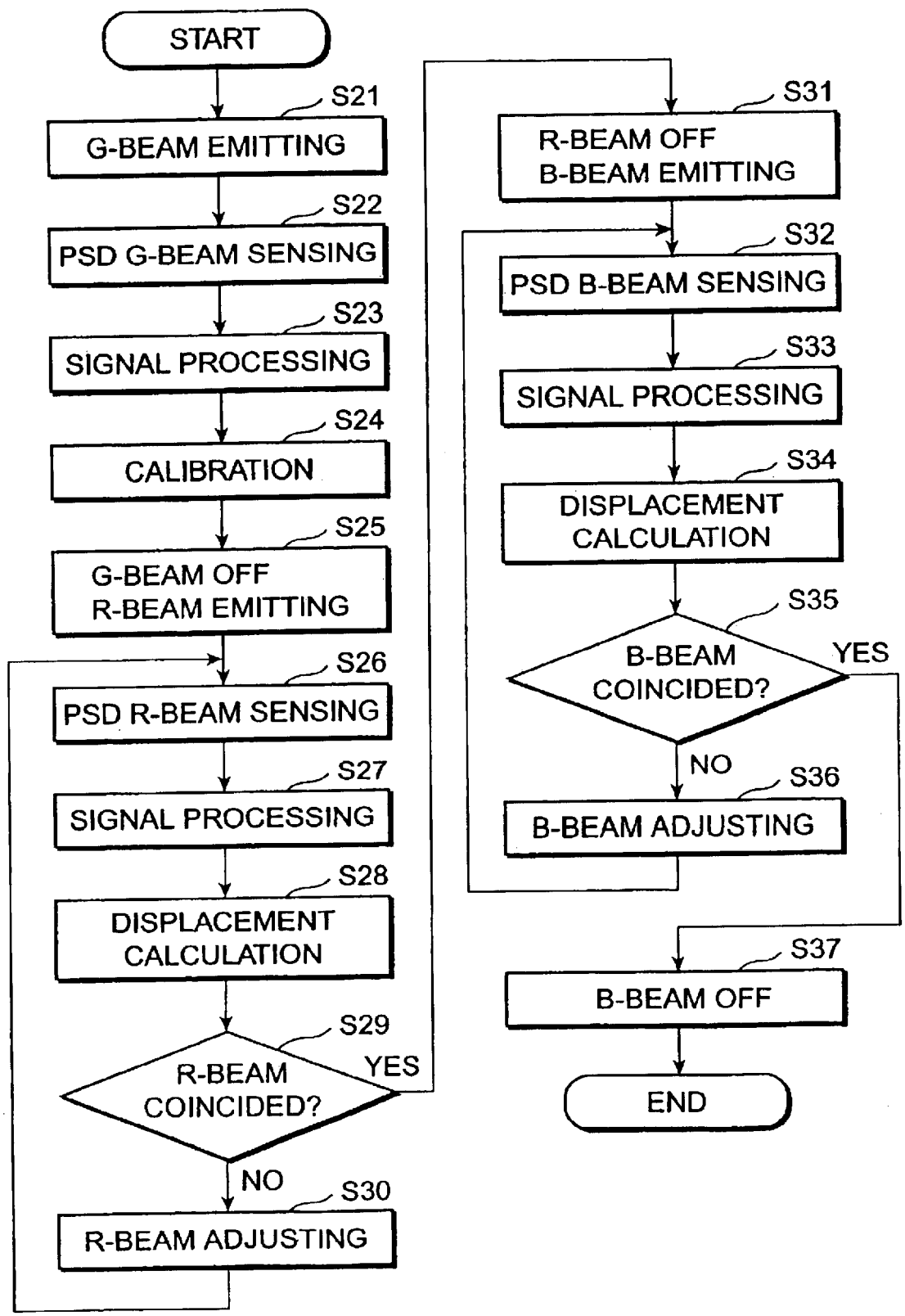
FIG. 8 is a flowchart for showing adjustment process of the optical paths of the laser beam scanner using the modified mirror shown in FIG. 7 in the embodiment.

The actuator 300 can automatically be controlled, for example, by the CPU 203 shown in FIG. 4. The automatic adjustment of the optical paths in the laser beam scanner by this modification is described with reference to a flowchart shown in FIG. 8.

When an automatic adjustment program starts, the green laser beam (G-beam) is oscillated by and emitted from the laser light source 104G (Step S21). When the green laser beam passing through the mirror 126 reaches to the position sensor 201, the position sensor 201 starts to sense the position of green laser beam and outputs signals corresponding to the sensed position of green laser beam (Step S22). The signal processor 202 executes the predetermined signal processing to the output signals corresponding to the position of green laser beam from the position sensor 201 (Step S23). The CPU 203 memorizes the output signals corresponding to the position of green laser beam into the RAM 205 as the standard point to be adjusted (calibration: Step S24).

Subsequently, the emission of the green laser beam by the laser light source 104G is switched off, and the red laser beam is emitted from the laser light source 104R (Step S25). When the red laser beam passing through the mirror 126 reaches to the position sensor 201, the position sensor 201 senses the position of red laser beam and outputs signals corresponding to the sensed position of red laser beam (Step S26). The signal processor 202 executes the predetermined signal processing to the output signals corresponding to the position of red laser beam from the position sensor 201 (Step S27). The CPU 203 compares the signals corresponding to the position of green laser beam and the position of red laser beam and calculates a quantity of the displacement between the position of red laser beam and the position of green laser beam (Step S28).

When the quantity of the displacement is calculated, the CPU 203 judges whether the discrepancy or the displacement between the position of red laser beam and the position of green laser beam can be acceptable or not (Step S29). When the discrepancy or the displacement between the position of red laser beam and the position of green laser beam cannot be acceptable, the CPU 203 controls to drive the actuator 300 for adjusting the reflection angle of the adjustable mirror 110 corresponding to the red laser beam by using the quantity of the displacement (Step S30). Subsequently, the steps S26 to S30 are repeated until the position of red laser beam coincides with the position of green laser beam or the discrepancy between the position of red laser beam and the position of green laser beam can be acceptable.

When the position of red laser beam coincides with the position of green laser beam or the discrepancy between the position of red laser beam and the position of green laser beam can be acceptable (YES in Step S29), the emission of the red laser beam by the laser light source 104R is switched off, and the blue laser beam is emitted from the laser light source 104B (Step S31). When the blue laser beam passing through the mirror 126 reaches to the position sensor 201, the position sensor 201 senses the position of the blue laser beam and outputs signals corresponding to the sensed position of blue laser beam (Step S32). The signal processor 202 executes the predetermined signal processing to the output signals corresponding to the position of blue laser beam from the position sensor 201 (Step S33). The CPU 203 compares the signals corresponding to the position of green laser beam and the position of blue laser beam and calculates a quantity of the displacement between the position of blue laser beam and the position of green laser beam (Step S34).

When the displacement is calculated, the CPU 203 judges whether the discrepancy or the displacement between the position of blue laser beam and the position of green laser beam can be acceptable or not (Step S35). When the discrepancy or the displacement between the position of blue laser beam and the position of green laser beam cannot be acceptable, the CPU 203 controls to drive the actuator 300 for adjusting the reflection angle of the adjustable mirror 110 corresponding to the blue laser beam by using the quantity of the displacement (Step S36). Subsequently, the steps S32 to S36 are repeated until the position of blue laser beam coincides with the position of green laser beam or the discrepancy between the position of blue laser beam and the position of green laser beam can be acceptable.

When the position of blue laser beam coincides with the position of green laser beam or the discrepancy between the position of blue laser beam and the position of green laser beam can be acceptable (YES in Step S35), the emission of the blue laser beam by the laser light source 104R is switched off (Step S37), and the adjustment of the optical paths in the laser beam scanner is completed.

By this modification, the reflection angles of the adjustable mirrors 110 can automatically be adjusted, so that it is not necessary to adjust the optical paths manually, even when the electronic element such as the laser light source 104R, 104G or 104B or the acousto-optic modulator 108 is interchanged due to the deterioration thereof. Furthermore, it is preferable to adjust the adjustable mirrors 110 at a predetermined periodic interval with no relation to the interchange of the electronic elements.

In the above-mentioned embodiment, the optical paths 105 of the laser beam scanner 100 are adjusted so that the red and blue laser beams are to be overlapped on the green laser beam. It, however, is possible to adjust the blue and green laser beams to be overlapped on the red laser beam. Alternatively, it is possible to adjust the red and green laser beams to be overlapped on the blue laser beam. Furthermore, it is possible to adjust the optical paths in a manner so that the red, green and blue laser beams are to be overlapped at a predetermined position, for example, the center on the position sensor 201.

Furthermore, in the above-mentioned embodiment, a half mirror is used as the mirror 126 disposed at the final stage of the optical path in the laser beam scanner 100. It, however, is possible to use a total reflection mirror as the mirror 126 which is withdrawal while the optical paths are adjusted, as shown by dotted line in FIG. 4. By such a configuration, the reflectance of the mirror 126 can be increased. Furthermore, in the above-mentioned embodiment, the two-dimensional position sensitive detector is used as the position sensor 201. It, however, is possible to use a plurality of one-dimensional position sensitive detectors which are tightly disposed. Furthermore, another monitor display device can be used instead of the synchroscope.

Furthermore, in the above-mentioned description, the reflection angle of the mirror body 112 of the adjustable mirror 110 can be adjusted uniaxially around the shaft 113. It, however, is possible to adjust the reflection angle of the mirror body 112 by axially around the shaft 113 and another axis perpendicular to the shaft 113 by tilting the mirror holder 111.

Furthermore, the position of the position sensor 201 is not restricted by the illustration. It is possible to provide at anywhere conjugated with the scanning line or scanning plane P1. For example, when the mirror 124 is formed as a half mirror, it is possible to provide the position sensor 201 on the same plane as the polygon mirror 120 in the housing 102 of the laser beam scanner 100. Furthermore, in the above-mentioned embodiment, the polygon mirror 120 and the fθ lens 121 are disposed on the same plane as the laser light sources 104R, 104G and 104B and the adjustable mirrors 110. It, however, is possible to dispose the polygon mirror 120 and the fθ lens 121 on a plane different from the laser light sources 104R, 104G and 104B and the adjustable mirrors 110 by providing a pair of parallel mirrors, so that the horizontal area occupying the laser beam scanner can be made narrower even though the height of the laser beam scanner increases.

Furthermore, the laser beam scanner 100 is used for exposing the photographic paper in the photographic printer. It, however, is not restricted the use of the laser beam scanner in accordance with the present invention. It is possible to apply the exposing unit of a color laser beam printer, or the like.

This application is based on patent application 2000-078985 filed in Japan, the contents of which are hereby incorporated by references.

Although the present invention has been fully described by way of example with reference to the accompanying drawings, it is to be understood that various changes and modifications will be apparent to those skilled in the art.

Therefore, unless otherwise such changes and modifications depart from the scope of the present invention, they should be construed as being included therein.

What is claimed is:

1. A photographic printer comprising:
   a laser beam scanner including:
      a first laser light source for oscillating and emitting a red laser beam;
      a second laser light source for oscillating and emitting a green laser beam;
      a third laser light source for oscillating and emitting a blue laser beam;
   a conveyor for linearly conveying a photographic paper to a predetermined scanning plane of the laser beam scanner at a predetermined constant speed;
   an optical scanning system for scanning the laser beams on the predetermined scanning plane coinciding with a surface of the photographic paper when being conveyed thereto;
   an optical path adjusting system for adjusting optical paths of the optical scanning system, including:
      a position sensor disposed on a plane optically conjugated with a plane corresponding to the photographic paper at the predetermined scanning plane;
      a first adjuster for adjusting an optical path of the first laser beam;
      a second adjuster for adjusting an optical path of the second laser beam;
      a third adjuster for adjusting an optical path of the third laser beam, whereby all the positions of the laser beams can be adjusted to overlap at a certain point on the predetermined scanning plane.

2. The photographic printer in accordance with claim 1, wherein the optical scanning system includes a beam splitter for splitting the laser beams in a first way for introducing the laser beams toward the scanning plane and a second way for introducing split laser beams toward the position sensor.

3. The photographic printer in accordance with claim 1, wherein the optical path adjusting system further includes a monitor display for displaying the positions of the laser beams on the position sensor.

4. The photographic printer in accordance with claim 1, wherein each of the adjusters is a mirror provided in the optical scanning system and manually rotatable around an axis for adjusting a reflection angle of the laser beam.

5. The photographic printer in accordance with claim 4, wherein the optical scanning system includes a polygon mirror rotating at a constant rotation speed, and each of the adjusters is disposed between the laser light sources and the polygon mirror.

6. The photographic printer in accordance with claim 1, wherein each of the adjusters is a mirror provided in the optical scanning system and rotated around an axis by an actuator for adjusting a reflection angle of the laser beam.

7. The photographic printer in accordance with claim 6, wherein the optical scanning system includes a polygon mirror rotating at a constant rotation speed, and each of the adjusters is disposed between the laser light sources and the polygon mirror.

8. A photographic printer comprising:
   a laser beam scanner including:
      a first laser light source for oscillating and emitting a red laser beam;
      a second laser light source for oscillating and emitting a green laser beam;
      a third laser light source for oscillating and emitting a blue laser beam;
   a conveyor for linearly conveying a photographic paper to a predetermined scanning plane of the laser beam scanner at a predetermined constant speed;
   an optical scanning system for scanning the laser beams on the predetermined scanning plane coinciding with a surface of the photographic paper when being conveyed thereto;
   an optical path adjusting system for adjusting optical paths of the optical scanning system, including:
      a position sensor disposed on a plane optically conjugated with a plane corresponding to the photographic paper at the predetermined scanning plane;
      a first adjuster for adjusting an optical path of the first laser beam;
      a second adjuster for adjusting an optical path of the second laser beam;
      a third adjuster for adjusting an optical path of the third laser beam, whereby all the positions of the laser beams can be adjusted to overlap at a certain point on the predetermined scanning plane,
   wherein said optical scanning system includes a total reflection mirror for reflecting the laser beam toward the scanning plane and withdrawal while the optical paths are adjusted.

9. A photographic printer, comprising:
   a laser beam scanner including:
      a first laser light source for oscillating and emitting a red laser beam;
      a second laser light source for oscillating and emitting a green laser beam;
      a third laser light source for oscillating and emitting a blue laser beam;
   a conveyor for linearly conveying a photographic paper to a predetermined scanning plane of the laser beam scanner at a predetermined constant speed;
   an optical scanning system for scanning the laser beams on the predetermined scanning plane coinciding with a surface of the photographic paper when being conveyed thereto;
   an optical path adjusting system for adjusting optical paths of the optical scanning system, including:
      a position sensor disposed on a plane optically conjugated with a plane corresponding to the photographic paper at the predetermined scanning plane;
      a first adjuster for adjusting an optical path of the first laser beam;
      a second adjuster for adjusting an optical path of the second laser beam;
      a third adjuster for adjusting an optical path of the third laser beam, whereby all the positions of the laser beams can be adjusted to overlap at a certain point on the predetermined scanning plane,
   wherein each of the adjusters is a mirror provided in the optical scanning system and rotated around an axis by an actuator for adjusting a reflection angle of the laser beam; and
   wherein the optical path adjusting system further includes a processor for calculating a quantity of displacement between the positions of the laser beams on the position sensor, and for controlling the actuator for coinciding the positions of the laser beams by using the calculated quantity of the displacement.

10. A photographic printer comprising:
    a laser beam scanner including:
       a first laser light source for oscillating and emitting a red laser beam;

a second laser light source for oscillating and emitting a green laser beam;

a third laser light source for oscillating and emitting a blue laser beam;

a conveyor for linearly conveying a photographic paper to a predetermined scanning plane of the laser beam scanner at a predetermined constant speed;

an optical scanning system for scanning the laser beams on the predetermined scanning plane coinciding with a surface of the photographic paper when being conveyed thereto;

an optical path adjusting system for adjusting optical paths of the optical scanning system, including:
- a position sensor disposed on a plane optically conjugated with a plane corresponding to the photographic paper at the predetermined scanning plane, and
- a first adjuster for adjusting an optical path of the first laser beam;
- a second adjuster for adjusting an optical path of the second laser beam;
- a third adjuster for adjusting an optical path of the third laser beam,
- wherein said first adjuster is a mirror provided in the optical scanning system and rotatable around two different axes for adjusting a reflection angle of the first laser beam and
- said second adjuster is a mirror provided in the optical scanning system and rotatable around two different axes for adjusting a reflection angle of the second laser beam and
- said third adjuster is a mirror provided in the optical scanning system and rotatable around two different axes for adjusting a reflection angle of the third laser beam whereby all the positions of the laser beams can be adjusted to overlap at a certain point on the predetermined scanning plane.

11. A photographic printer comprising:

a laser beam scanner including:
- a first laser light source for oscillating and emitting a red laser beam;
- a second laser light source for oscillating and emitting a green laser beam;
- a third laser light source for oscillating and emitting a blue laser beam;

a conveyor for linearly conveying a photographic paper to a predetermined scanning plane of the laser beam scanner at a predetermined constant speed;

an optical scanning system for scanning the laser beams on the predetermined scanning plane coinciding with a surface of the photographic paper when being conveyed thereto;

an optical path adjusting system for adjusting optical paths of the optical scanning system, including:
- a position sensor disposed on a plane optically conjugated with a plane corresponding to the photographic paper at the predetermined scanning plane, and
- a first adjuster for adjusting an optical path of the first laser beam;
- a second adjuster for adjusting an optical path of the second laser beam;
- a third adjuster for adjusting an optical path of the third laser beam;
- a monitor display for displaying images corresponding to the relative positions of the first laser beam and the second laser beam on the position sensor and said monitor display is detachable from the optical path adjusting system.

12. A photographic printer comprising:

a laser beam scanner including:
- a first laser light source for oscillating and emitting a red laser beam;
- a second laser light source for oscillating and emitting a green laser beam;
- a third laser light source for oscillating and emitting a blue laser beam;

a conveyor for linearly conveying a photographic paper to a predetermined scanning plane of the laser beam scanner at a predetermined constant speed;

an optical scanning system for scanning the laser beams on the predetermined scanning plane coinciding with a surface of a the photographic paper when being conveyed thereto;

an optical path adjusting system for adjusting optical paths of the optical scanning system, including:
- a position sensor disposed on a plane optically conjugated with a plane corresponding to the photographic paper at the predetermined scanning plane;
- a first adjuster for adjusting an optical path of the first laser beam;
- a second adjuster for adjusting an optical path of the second laser beam;
- a third adjuster for adjusting an optical path of the third laser beam, whereby all the positions of the laser beams can be adjusted to overlap at a certain point on the predetermined scanning plane; and
- a developer for developing a latent image exposed on the photographic paper by the laser beam scanner.

* * * * *